Dec. 13, 1927.　　　　　　　　　　　　　　　　1,652,622
F. HEDLEY ET AL
ONE-MAN CAR CONTROL EQUIPMENT
Filed Jan. 25, 1923　　　　9 Sheets-Sheet 1
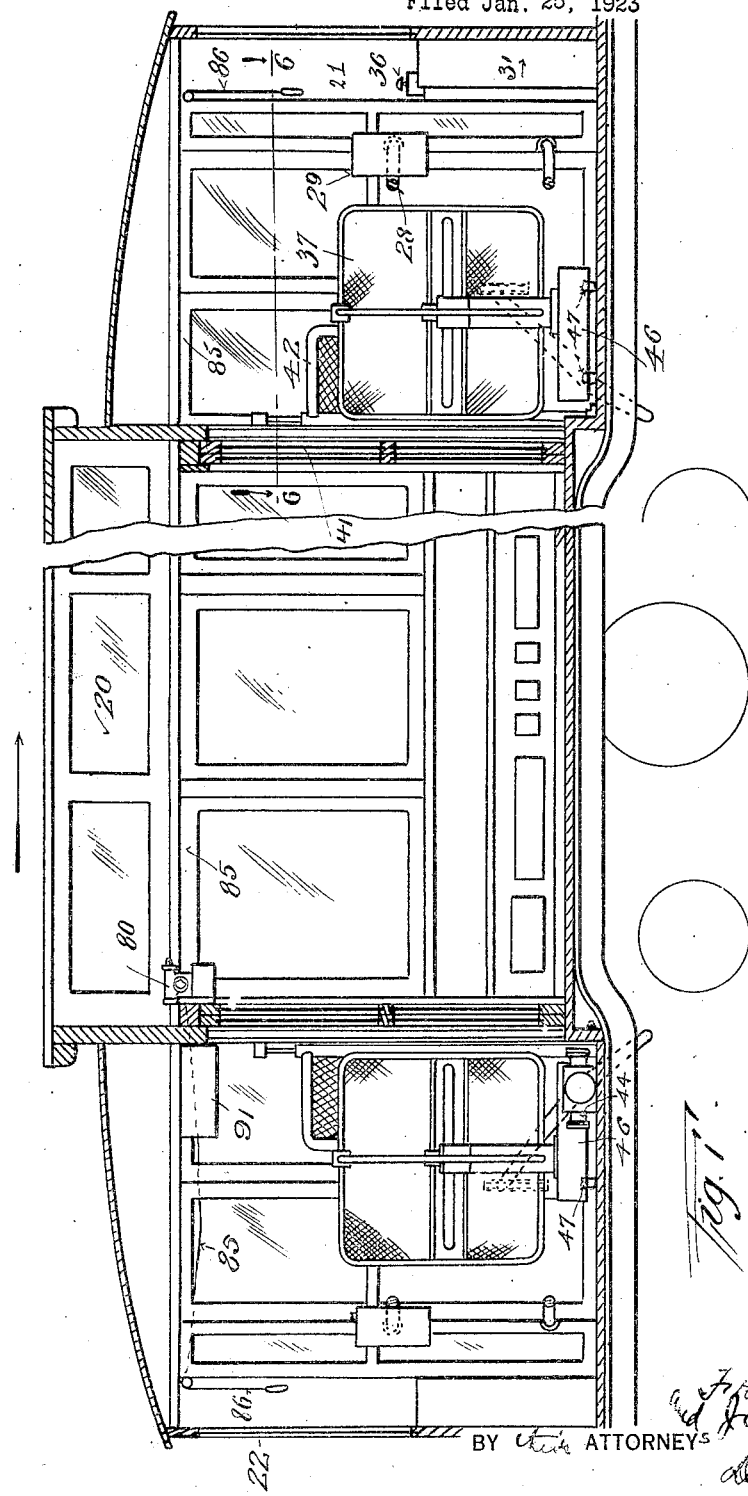

Dec. 13, 1927.  
F. HEDLEY ET AL  
1,652,622  
ONE-MAN CAR CONTROL EQUIPMENT  
Filed Jan. 25, 1923  
9 Sheets-Sheet 2
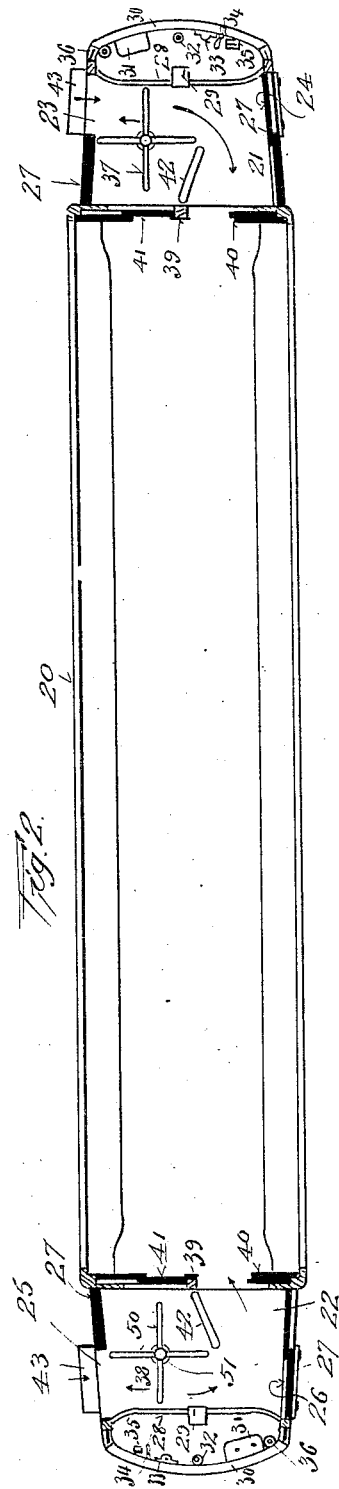
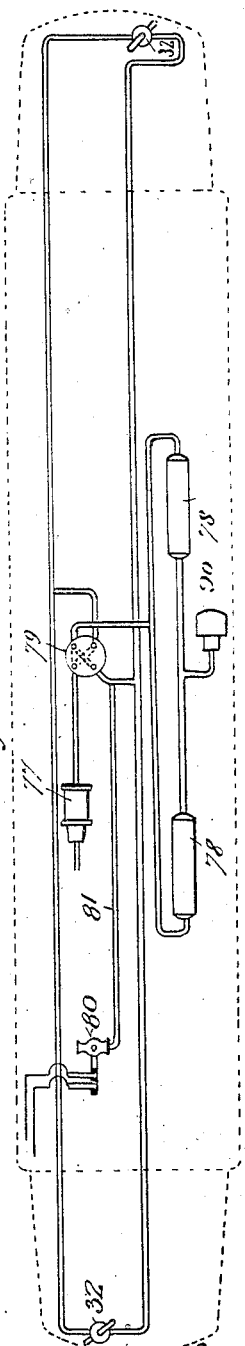
INVENTOR  
Frank Hedley  
and James S. Doyle  
BY their ATTORNEYS  
Darby & Darby

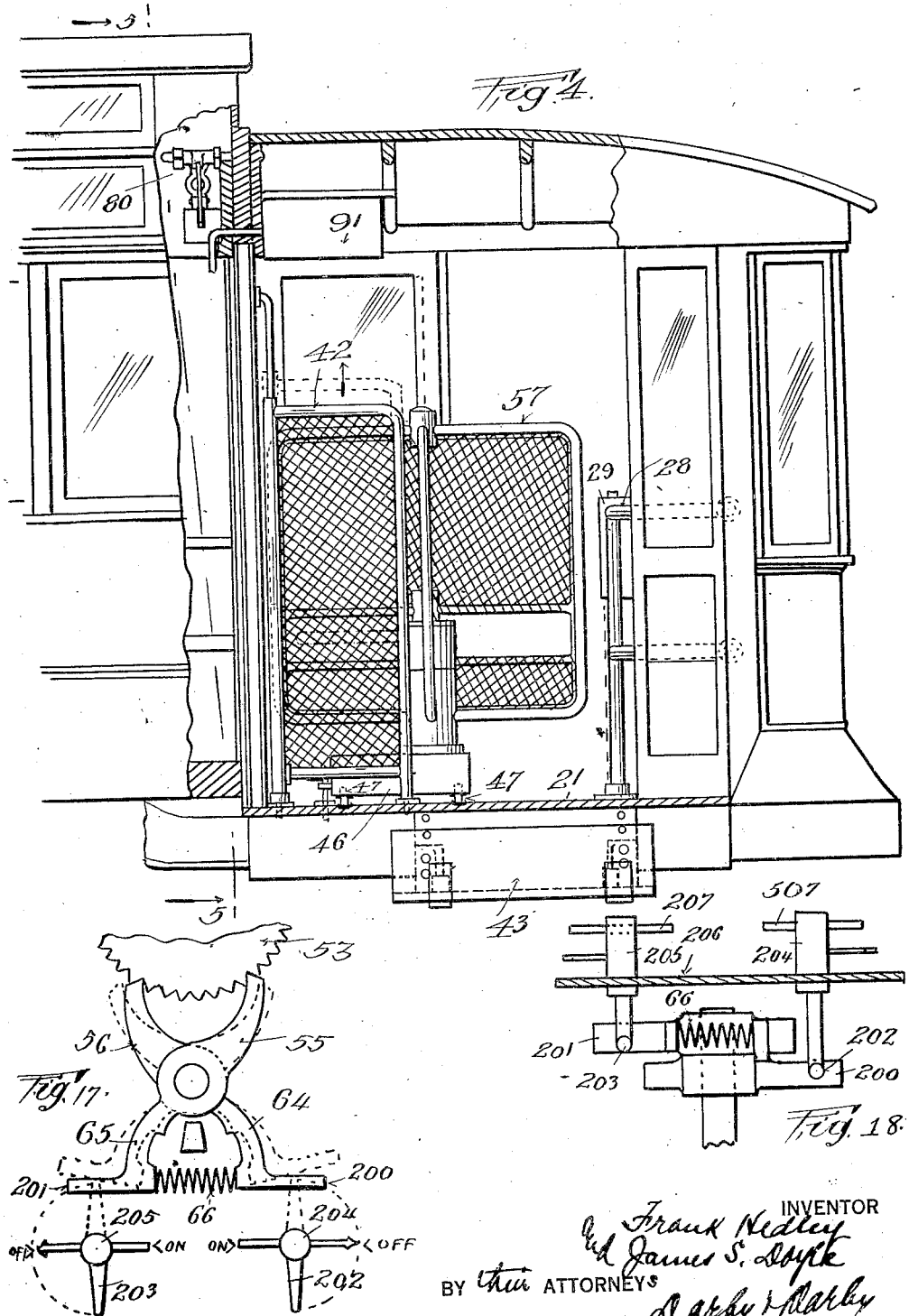

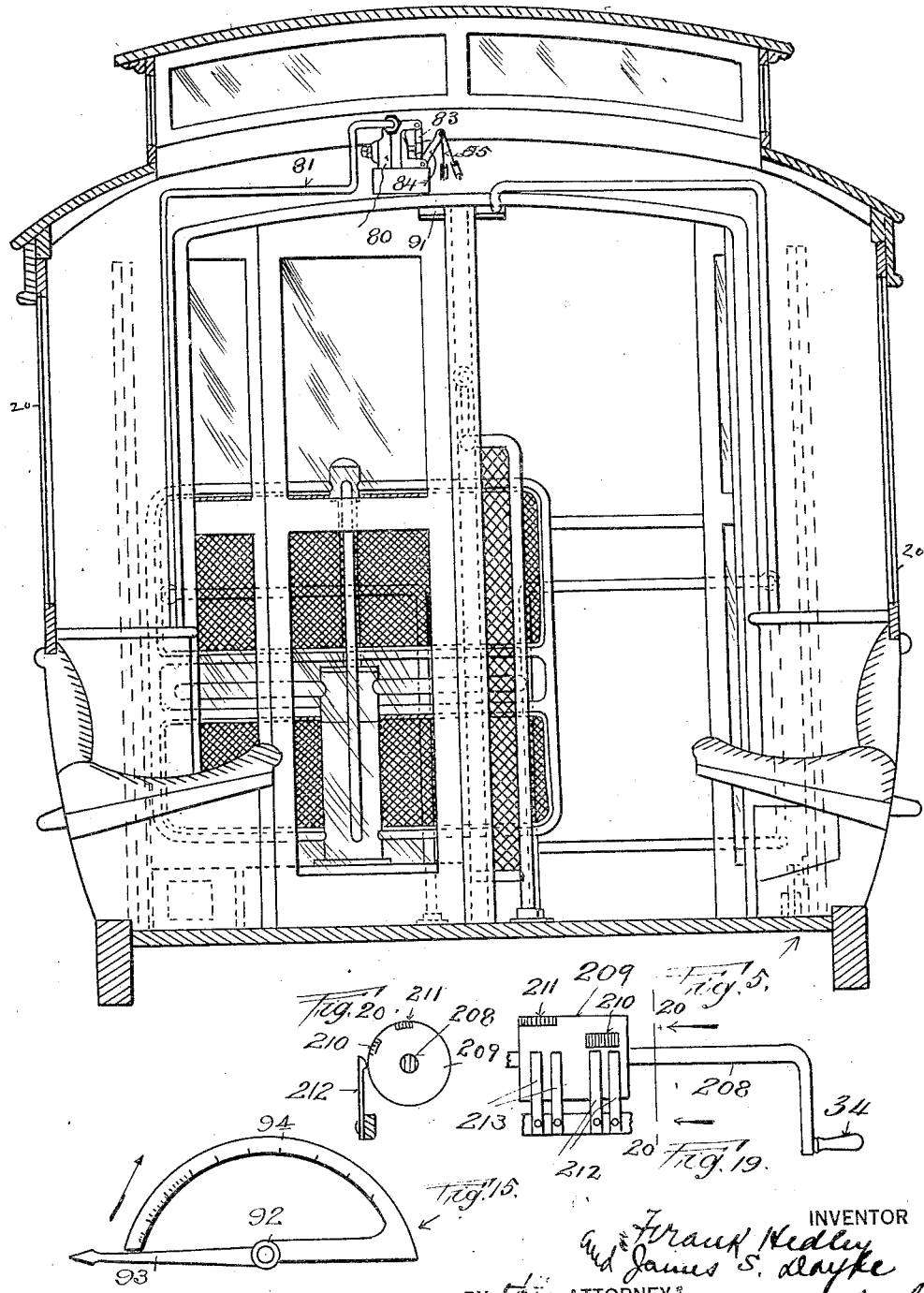

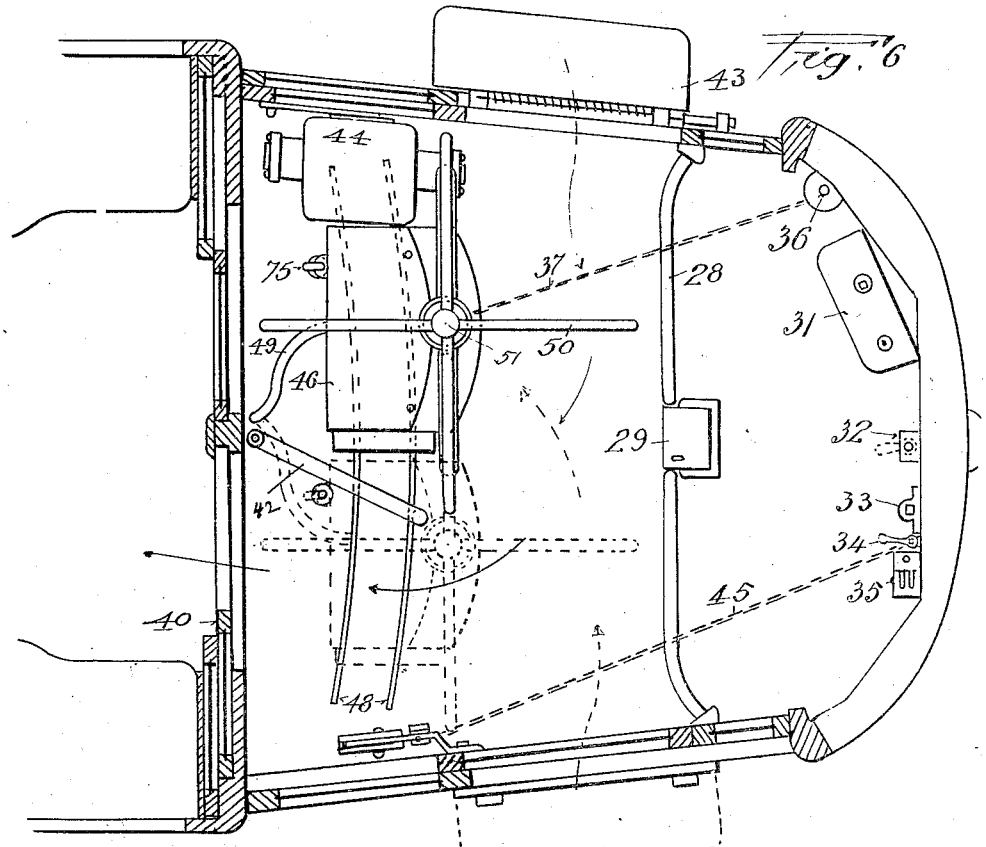
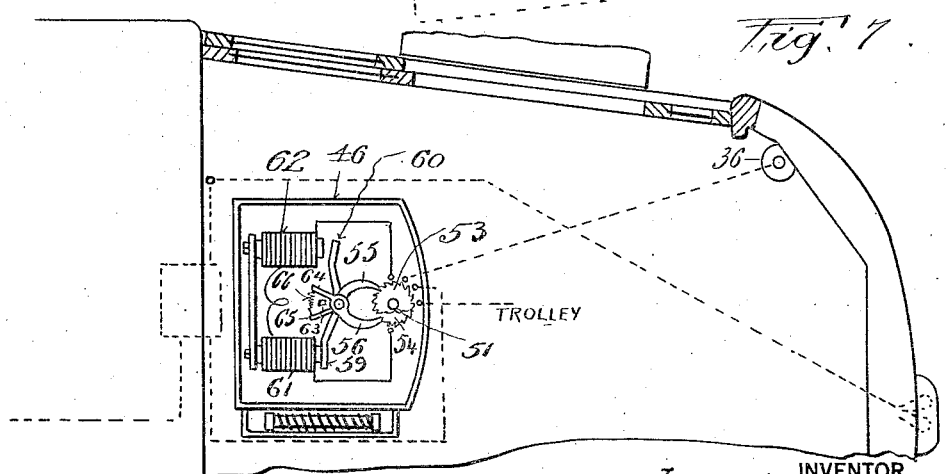

Dec. 13, 1927.
F. HEDLEY ET AL
1,652,622
ONE-MAN CAR CONTROL EQUIPMENT
Filed Jan. 25, 1923
9 Sheets-Sheet 6
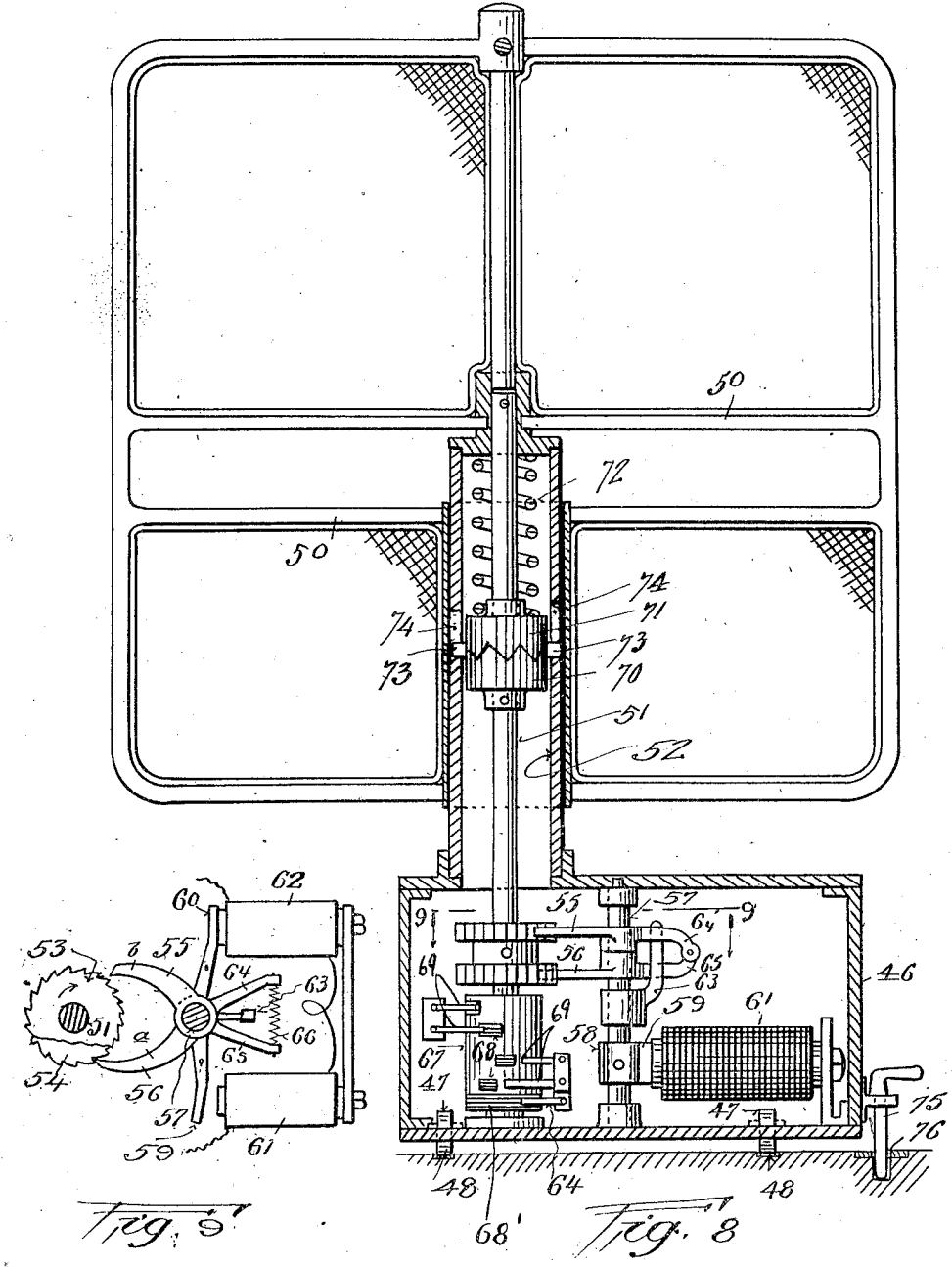
INVENTOR
Frank Hedley
James S. Doyle
BY their ATTORNEYS
Darby & Darby

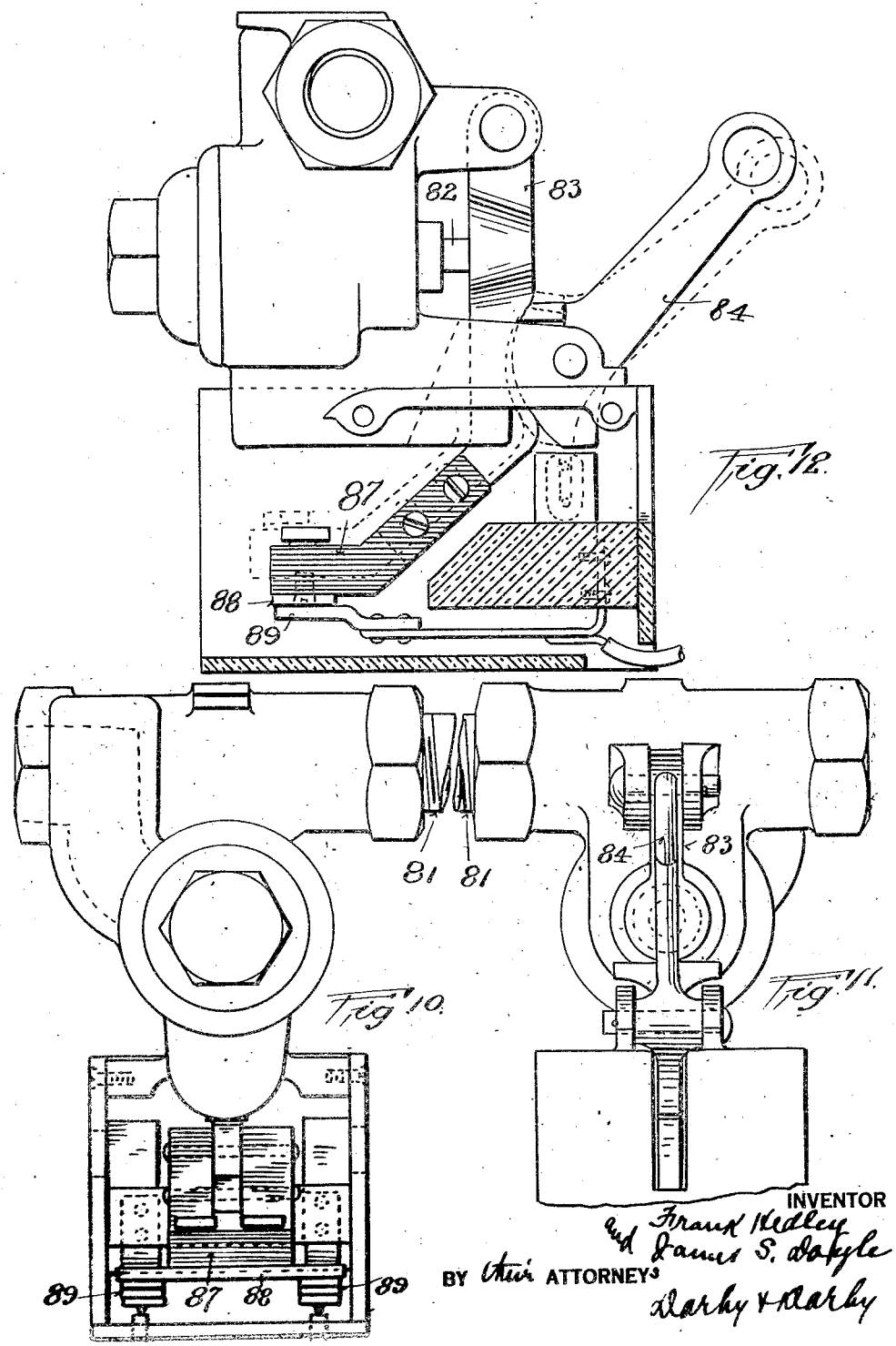

Dec. 13, 1927.

F. HEDLEY ET AL 1,652,622

ONE-MAN CAR CONTROL EQUIPMENT

Filed Jan. 25, 1923 9 Sheets-Sheet 8

INVENTOR
Frank Hedley
and James S. Doyle
BY THEIR ATTORNEYS
Darby & Darby

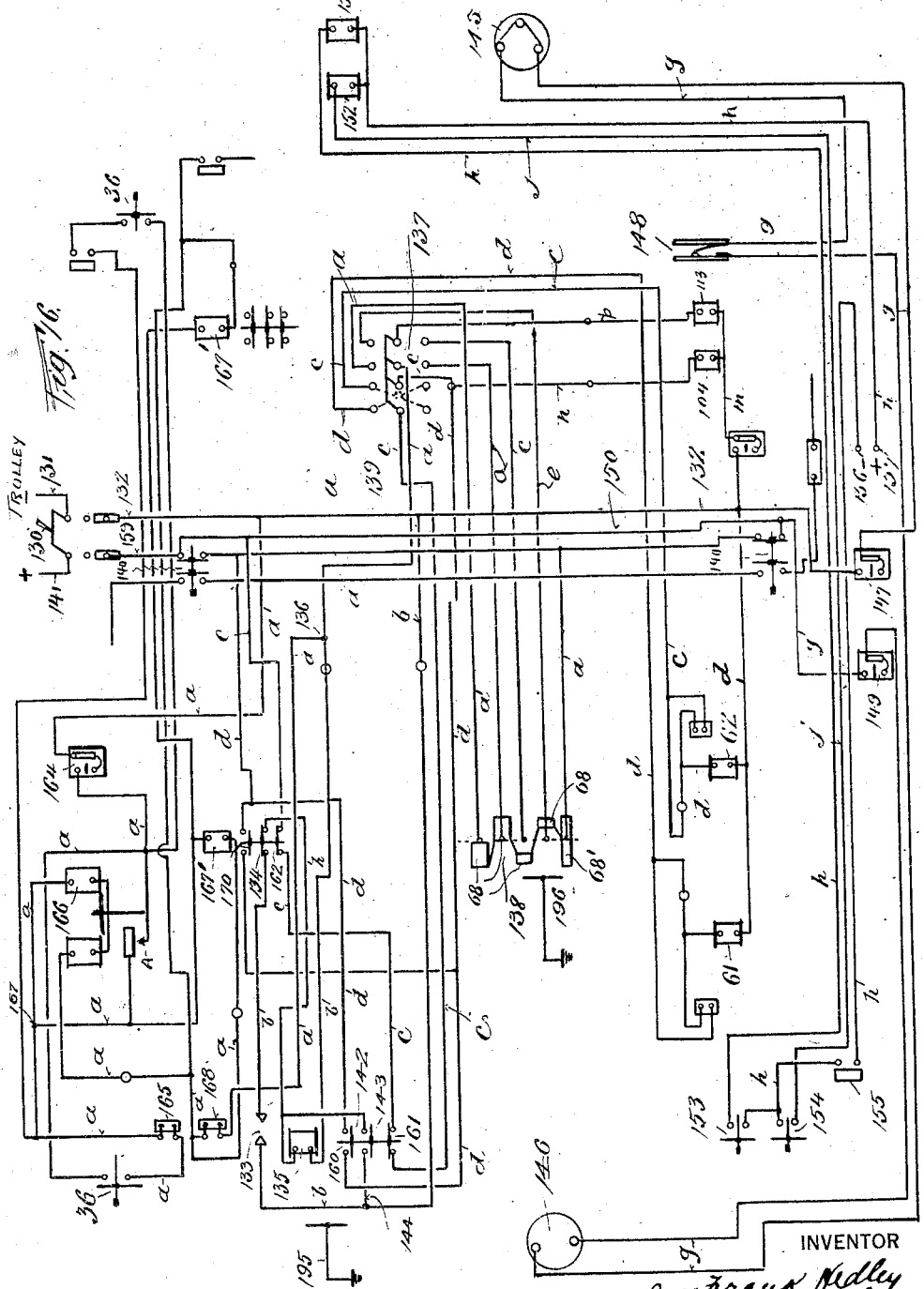

Patented Dec. 13, 1927.

1,652,622

UNITED STATES PATENT OFFICE.

FRANK HEDLEY, OF YONKERS, AND JAMES S. DOYLE, OF MOUNT VERNON, NEW YORK.

ONE-MAN-CAR CONTROL EQUIPMENT.

Application filed January 25, 1923. Serial No. 614,740.

This invention relates to car equipments, and more particularly to the equipment of cars designed for one-man control.

The object of the invention is to provide a car equipment which is simple and effective, whereby a car under the control of a single man permits the entrance and exit of passengers at each end of the car while insuring the collection of a fare or a transfer from every passenger carried.

A further object of the invention is to provide an equipment for cars which permits passengers to enter and leave a car at both ends of the car, and whereby either the exit or entrance movements of passengers are coin controlled.

A further object of the invention is to provide a coin controlled turnstile structure for each end of a car, each turnstile structure being normally free for operation in one direction, and coin controlled in operation in the opposite direction.

A further object of the invention is to provide a turnstile mechanism of the nature referred to at each end of a car which is shiftable from one side to the other of the car for use in connection with the side doors of the car for one side or the other as conditions of operation of the car may require.

A further object of the invention is to provide a car equipment of the nature referred to wherein provision is made for the registration or control of the collection of transfers and of movements in leaving the car of passengers traveling on transfers.

A further object of the invention is to provide a car equipment which is simple and effective for registering or indicating the entrance and exit movements of passengers boarding and alighting from a car so that the total number of passengers occupying the car at any given instant may be ascertained and indicated.

A further object of the invention is to provide a registering or indicating apparatus or equipment of the nature referred to which operates automatically to indicate when a predetermined number of passengers have boarded a car, or when a predetermined number of passengers occupy the car.

A further object of the invention is to provide a registering or indicating apparatus of the nature referred to which automatically displays a "car full" sign when the passengers occupying the car attain a predetermined number.

A further object of the invention is to provide a car equipment of the nature referred to wherein in case of emergency any passenger in the car can effect an emergency application of the brakes and cut off the supply of motive power from the propelling motors of the car.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the accompanying drawings:—

Fig. 1 is a broken view in vertical central longitudinal section, showing a street car having an equipment for one-man control, embodying the principles of our invention.

Fig. 2 is a view in top floor plan of the same.

Fig. 3 is a view in diagram showing the arrangement of brake control mechanism employed in connection with a car equipment embodying our invention.

Fig. 4 is a view in side elevation, parts in vertical section, and parts broken out, of the side of one end of a car equipped in accordance with the principles of our invention.

Fig. 5 is a view in vertical transverse section on the line 5, 5, Fig. 4, looking in the direction of the arrows.

Fig. 6 is a broken view in horizontal section on the line 6, 6, of Fig. 1, looking in the direction of the arrows.

Fig. 7 is a view similar to Fig. 6, with the turnstile removed from its stand or base showing the arrangement of magnet coils for controlling the locking dogs or pawls.

Fig. 8 is a view in vertical section through the shiftable turnstile structure employed in connection with our invention.

Fig. 9 is a broken detail view in section on the line 9, 9, Fig. 8, looking in the direction of the arrows.

Figs. 10, 11 and 12 are detail views in elevation and in section respectively of the conductor's brake control valve structure employed in connection with our invention.

Fig. 15 is a broken detail view showing a portion of the indicating mechanism employed in connection with the structures of Figs. 13 and 14.

Fig. 16 is a circuit diagram employed in carrying out the principles of our invention.

Fig. 17 is a broken detail view, somewhat diagrammatic, showing one form of means to release the turnstile in case of emergency to permit its free operation in both directions.

Fig. 18 is a broken detail view in elevation of the structure shown in Fig. 17.

Fig. 19 is a broken detail view showing one form of means to control the operation of a door at one end of the car when the door at the other end is manually operated.

Fig. 20 is a similar view in section on the line 20, 20, Fig. 19.

The same part is designated by the same reference character wherever it occurs throughout the several views.

Figure 13:
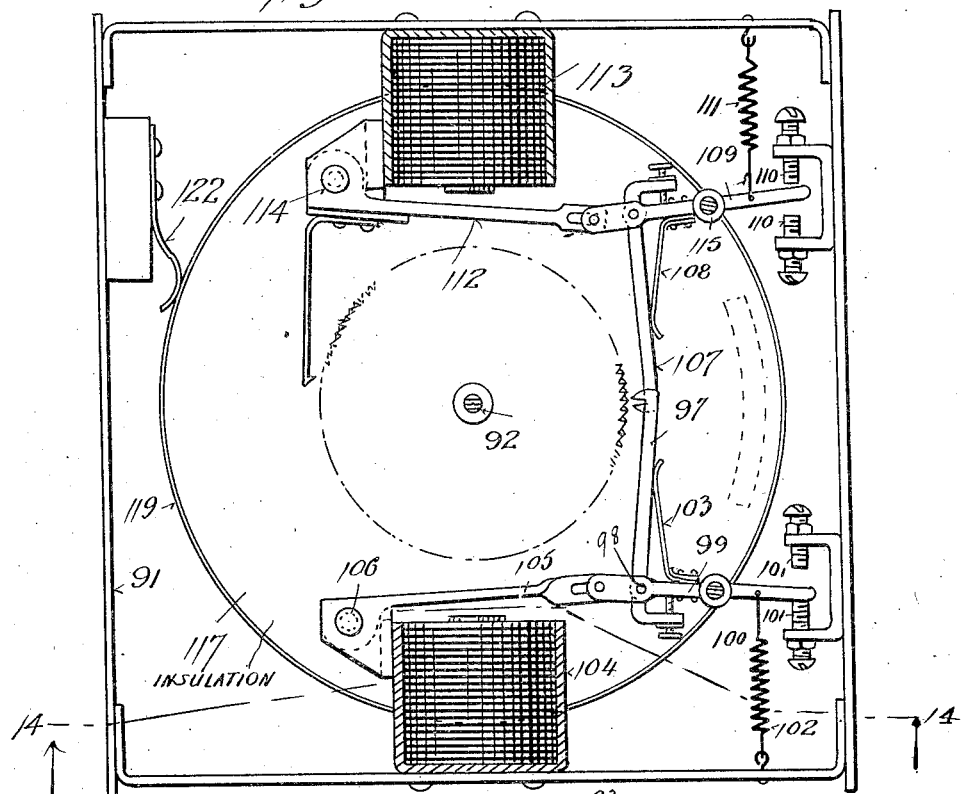
Fig. 13 is a view in horizontal section on the line 13, 13, Fig. 14.

The problem of handling street car traffic, particularly in crowded or congested streets where the traffic is heavy, imposes many demands upon the management of street car systems. The most important requirements from the standpoint of the street car traveling public is safety of transportation, as well as speed or expedition in boarding and alighting from the car and in the maintenance of the time schedule of operation of the cars. Among the important requirements on the part of the management are the collection of a fare from every passenger transported, together with an accounting and proper registration of passengers carried on passes or transfers. Moreover, the cost of operation of a street car system is greatly increased by the necessity of employing a motorman and also a conductor upon each car. The modern trend has been towards the operation of surface cars by a single employee in so-called one-man car operation. This practice as heretofore carried out has imposed such manifold duties upon the single employee or operator of the car in supervising the boarding and alighting movements of passengers, the collection of fares and transfers and their registrations, the issuance of transfers, making change, and control of the operation of the doors and steps of the car, as well as the proper control and operation of the propelling motor and the proper observance of speed and traffic conditions encountered along the route, have so retarded the time schedule of operation and caused such delays in boarding and alighting of passengers and fare collections as to be impractical for use in localities except where traffic is normally exceedingly light, and even in such cases danger is incurred and frequently experienced in the failure of the fare being collected or accounted for to the company for each passenger transported. This failure is due, in some cases, to passengers at some congested points crowding onto the car in such numbers that the conductor is unable to collect a fare from each one. In other instances such failure is due to the operation of dishonest employees, and in any event the imposition of such manifold and numerous duties upon a single employee in control of the safety operation of the car is such as to greatly impair the effectiveness of his service in the discharge of his many duties.

It is among the special purposes of our present invention to avoid these and other serious defects obtaining in present practice, and to provide an equipment for cars which can be applied easily and readily to standard styles and makes of street cars at present in general use, and which will relieve the one man of many of the duties imposed in one-man control of cars as heretofore practiced, thereby enabling him to operate his car at greater speed, with greater security and safety to his passengers, and which will insure the collection of a fare, token or transfer from every passenger transported, and will effect automatically an indication of the total number of passengers occupying the car at any instant of time, and an indication or sign when the car has attained a desired capacity of passengers. We also propose, in accordance with our invention, to provide a car equipment which will enable any passenger, as well as the motorman, to effect an emergency application of the brakes, and to disconnect the motive power from the propelling motor, thereby avoiding danger of accident by imminent collision. We also propose to provide means which are simple and effective for recording or registering the number of transfers employed by passengers being transported. We also propose to provide an equipment for cars which will permit passengers to board and to alight from each end of the car while at the same time controlling either the entrance or exit movements of the passengers in such manner as to insure the collection of a fare or token or a transfer from each passenger transported.

In carrying out our invention we propose to mount upon the end platform at each end of a car of standard type, a turnstile mechanism, which is capable of being operated in conjunction or cooperation, with the side doorway in the end of the car on either side of the car, which turnstile mechanism at both ends of the car is arranged to permit normally free movement therepast of passengers in one direction, but which is controlled for movement of passengers therepast in the opposite direction. For example, the turnstile device at each end of the car may be normally free to permit passengers to enter the car, but are coin or token controlled to permit passengers to leave the car, whereby the passengers are free to enter the car at either end, but must deposit a coin or token in order to leave the car, and in case of use by a passenger of a transfer, we propose to make special provision for the release of the turnstile for exit operation of such passenger without the deposit of a coin or token. In that event, however, we propose to employ a register in order to account for each passenger using a transfer.

As an illustrative embodiment of our invention, we have shown an equipment embodying the principles thereof as applied to a street car 20 of an ordinary standard type with a platform 21, 22, at the respective ends thereof. The platform at each end is provided with doorways 23, 24, 25, 26, respectively, in the opposite sides of the platform, each doorway being controlled by a door 27. Arranged on each platform is a railing or barrier 28 extending transversely across the same near the end of the platform so as to provide between it and the end of the platform a space for the single man or attendant for the entire car. This railing or platform barrier 28 may also serve as a support for a fare box 29 arranged within the space formed by the railing 28 and the end wall 30 of the platform, see Fig. 2, and, if desired, and as usual, mounted upon or carried by the end wall 30 are the various devices concerned in the control of the operation of the car, such for instance as the car propelling motor controller 31, the emergency brake controller 32, the hand brake controller 33, the manual door controller 34, and the controller 35 for the adjacent platform door, as well as a device indicated at 36 which I will term the transfer switch. Also mounted upon each platform is a turnstile device indicated at 37, 38. Each platform is separated from the interior of the car by a bulkhead 39 in which are mounted the transversely sliding doors 40, 41. Associated with the bulkhead 39 is a swinging gate member 42 which may be swung towards one side or the other of the platform, according to which side thereof the turnstile mechanism 37, 38, is in cooperative relation with. In the arrangement shown in Fig. 2, for example, the conductor's station is in the conductor's space at the left hand end of the car. In this event the turnstile 38 is associated with the platform side doorway 25, and the bulkhead doorway 41 is closed while the bulkhead door 40 is opened and the swinging gate 42 is disposed in position to prevent passage through the turnstile in any path except through the doorway controlled by the open bulkhead doorway 40, then along the platform and the barrier railing 28, or in the opposite direction through the doorway 25, the turnstile, and the passageway defined thereby in conjunction with the barrier 28 across the platform and through the bulkhead doorway controlled by the door 40. Exactly the same operation and arrangement of the parts is shown for the platform at the opposite end of the car. In this instance the side doors 27, for the doorways 24, 26, are closed. The turnstile devices 37, 38, as will be more fully hereinafter explained, are constructed and arranged so that they are normally free for the entrance movements of passengers, but are coin controlled for exit operation. Therefore, in the arrangement shown, passengers are free to board the car at either end through the doorways 23, 25, their path of entrance being indicated by the arrows. In case a passenger desires to alight from the car, the passenger will leave the body of the car through the open bulkhead doorway, cross the platform, past the fare box 29, and will deposit a fare or token in the fare box, thereby automatically releasing the turnstile for exit operation, and at the same time locking it against entrance operation. The passenger will then pass through the turnstile and alight from the car. The movements of passengers boarding and alighting are thus effected, or may be effected, at both ends of the car at the same time, or, it may be, that while a passenger is alighting from the rear end of the car other passengers will be boarding the car at the front end, or vice versa. These operations of passengers boarding and alighting do not require the supervision of the conductor other than that of controlling the opening of the doors 27 of the doorways 23, 25. The doors at the opposite sides of the platforms are constantly maintained closed as long as the car is operating in a direction requiring the conductor's station at the left hand end of the car as viewed in Fig. 2. Likewise, the bulkhead doors 40, 41, are positioned in place requiring no further attention on the part of the conductor when the car is dispatched from the terminal station of the line. As above indicated, passengers are free to board the car and deposit their fares only when leaving the car. In case a passenger is traveling on a transfer instead of employing a coin or a token to release the turnstile for such a passenger to alight from the car the passenger delivers his transfer to the motorman who will operate the transfer switch or button indicated at 36. This manipulation not only releases the turnstile for exit operation to permit such passenger to pass through the turnstile, but it also effects a register so that the management or inspector at the end of the line may be apprised of the total number of persons who have been transported during the trip on transfers, while the fare boxes of the turnstile mechanism will contain a coin or token for every cash fare paying passenger.

If desired, as shown, and as usual the doorways 23, 24, 25, 26, may each be provided with a folding step 43 operated in the usual or any convenient manner by the operation of the adjacent door 27 so as to be folded up against the side of the car when the door 27 is closed, or to be let down into position for use when the door 27 is open. Likewise, the side doors may be power operated by motors indicated at 44 as well as manually in the usual or any well known manner, the manually operated devices being controlled by the motorman through the devices 34 and connecting links or members 45, see Fig. 6. The door control device 35 at one end of the car is designed to control the operation of the platform side door at the opposite end of the car, so that the motorman at the operating end of the car is enabled through circuit connections, or otherwise, to control the door movements in the sides of the car at both ends of the car, from his station at the front end of the car.

It is intended, in accordance with our invention, to employ the turnstile devices, 37, 38, for cooperative relation with respect to the doorways at opposite sides of each platform whereby either end of the car may be used as the motorman's station, and the doorways on either side of the car or platform may be used for entrance and exit movements of passengers according to the direction of travel of the car. One arrangement for permitting the cooperative relation of the turnstile with the doorways on opposite sides of the platform is to provide a shiftable turnstile mechanism capable of being shifted from one side of the platform towards the other as indicated on Fig. 6, the gate 43 being swung in one direction or the other according to the position of the turnstile mechanism. Where a shiftable turnstile device is employed we mount the turnstile upon a base 46, which is provided with suitable casters or rollers, if desired, indicated at 47 arranged to operate in curved trackways or guides 48 transversely across the floor of the platform. Any suitable arrangement may be provided for the circuit leads of the magnets which will permit the shifting of the turnstile without derangement of the circuits employed in connection with the turnstile mechanism. For example, the jumper connection 49 is made flexible so as to permit the shifting of the turnstile from one side of the platform to the other. The turnstile structure employed is exceedingly simple, and consists of the radially disposed arms 50 carried by a vertically disposed shaft 51 housed within a stationary sleeve 52, which is secured to the stand or base 46. The displacement of the barrier arms 50 causes rotation of the shaft member 51 in one direction or the other according to the direction of displacement of the arms. Mounted upon this shaft member 51 are ratchet wheels 53, 54, having ratchet teeth presented respectively in opposite directions to be engaged respectively by pawls 55, 56, respectively disposed so as to engage the ratchets 53, 54, on opposite sides of the shaft 51, as most clearly shown in Figs. 7, 8, and 9. Each of the pawls 55, 56, is carried by a stud shaft 57, upon which is secured a sleeve 58, having arms 59, 60, extending in diametrically opposite directions with respect to the stud shaft 57, and which constitute movable armatures for magnets 61, 62, respectively. Also mounted upon stud shaft 57 is a sleeve carrying a finger or projection 63 arranged to extend up into the space between extensions 64, 65, of the pawls 55, 56, respectively. A spring 66 is interposed between the extensions 64, 65. With this arrangement it will be seen that when one of the magnets 61, 62, is energized the stud shaft 57 is rocked so as to carry one of the pawls 55 out of engagement with its ratchet and the other into cooperative relation with its associated ratchet. This locks the turnstile shaft against rotation in one direction while leaving it free to rotate in the opposite direction. The function of the finger 63 is to insure a positive mechanical disengagement of one pawl or the other according to which magnet 61, 62 is energized. The function of the spring 66 is to insure a pawl and ratchet operation of either the one or the other of said pawls, according to which one is in practical operation. The circuits of the magnets 61, 62, are designed to be coin controlled, as will be more fully explained hereinafter. The lower end of the turnstile shaft 51 carries a drum 67, upon which are various contact segments 68 and ring 68' completely encircling the drum, with which cooperate fingers 69 for completing and controlling the circuit connections employed in connection with the control operations of the automatic indicating apparatus hereinafter to be referred to. This drum switch is provided for the purpose of controlling the proper operation of the device which indicates the number of passengers on a car. It is evident that as the turnstile is swung from one side of the car to the other on the tracks 48, that the direction of rotation of the turnstile must be reversed to permit, say, free entrance of passengers. In Figure 6, with the turnstile in the position shown in full lines, if the turnstile is free to rotate for boarding passengers in a clockwise direction, it will rotate in a counter-clockwise direction for the same free admission of passengers when swung to the other side of the car. If the indicating device of Figure 15 is to properly register the number of passengers on the car, there must be a change of connections to the control magnets 104 and 113 which form part of the automatic indicating apparatus to be fully described hereinafter. To accomplish this result, the contacts 68 are made in two pairs so that no matter which side of the car the turnstile is on, the proper operation of the magnets, and hence the indicating device, occurs. The change of the connections is accomplished by the switch 137, as clearly shown in the drawings, and is clearly apparent to one skilled in the art.

From this arrangement it will be seen that when one ratchet pawl 55 or 56 is out of engagement with its ratchet wheel 53 or 54, the other is in engagement, and hence the turnstile is always free for operation in one direction, and locked against operation in the other direction. That is, when free for entrance operation, which is its normal condition, it is locked against exit operation, the deposit of a coin or token being required to release it for exit operation, such release also operating to lock it against entrance operation. Thus, one of the magnets 61, 62, controls the exit operations, and the other the entrance operations of the turnstile.

Various arrangements may be employed to maintain the turnstile in proper centered relation. A simple arrangement is shown wherein the shaft 51 has mounted thereon the heads or sleeves 70, 71, one of which as 70 is fastened to the shaft, and the other is slidable thereon. The opposed faces of these heads or sleeves have engaging projections and seats, which are held in engagement by means of a spring 72 arranged to yieldingly oppose the endwise displacement of the head 71. This head is held against rotative movement with or relatively to the shaft 51, while permitting endwise movement thereon by means of lugs or fingers 73 thereon engaging in vertical slots 74 in the housing or casing 52.

The shiftable turnstile structure may be locked or held in its shifted position at either side of the car by any suitable or convenient means. We have shown a simple lock bolt device 75, carried by the base 46, and adapted to enter a socket 76 in the floor of the platform, to accomplish this purpose.

We will now describe a construction and arrangement of the brake operating mechanism employed in the one-man car equipment in accordance with our invention, whereby the motorman may control the car brakes from his station at either end of the car in the normal operation of the car, while permitting, in case of necessity, an emergency operation of the brakes either by the motorman or by any passenger of the car.

Referring particularly to Fig. 3, the brake operating cylinder is shown at 77, and may be of the usual or any desired structure designed for operation with compressed air supplied from one or more reservoirs 78, through what we will term an emergency valve 79, the air supply to the brake cylinder being controlled in normal operation from either end of the car by the motorman's brake valve 32. In case of emergency, we employ an auxiliary brake control device 80, which may be operated by the motorman from either end of the car, or by any passenger in the car. This auxiliary brake control device (see Figs. 10, 11 and 12) comprises a casing to which is connected a pipe 81, which leads to the emergency valve 79. The casing also opens to the atmosphere, and a plunger 82 controls the opening of the pipe 81 through the casing of the auxiliary device to the atmosphere. The plunger 82 is operated by a pivoted link 83, which is operated by a rock arm 84, to which is connected a rope or cord 85, which leads throughout the length of the car in position to be conveniently grasped and operated by any passenger in the car, and its ends 86 (see Fig. 1) depend into convenient position to be operated by the motorman at either end of the car. By rocking the arm 84 the supply of operating medium to the brake cylinder is controlled through the auxiliary device 80, thereby securing an emergency application of the brakes. It is desirable to also arrest the car propelling motor in case of such emergency brake operation. The mere application of the brakes may not always be sufficient to avert a collision, particularly if the car propelling motor is continued in operation. We propose, therefore, in carrying out our invention to provide means to open the circuit of the propelling motor coincidently with the operation of the auxiliary device 80 for emergency application of the brakes. This can be accomplished in various ways. A simple arrangement is shown wherein a switch in the motor circuit is opened when the auxiliary device 80 is operated. This switch, in the particular arrangement shown consists of an insulating member 87, carried by the pivoted link 83, upon which is mounted a contact 88, which cooperates with contact member 89. These contacts 88, 89, may be located in the propelling motor circuit or in a circuit to control a switch in said motor circuit. Thus it will be seen that when the link 83 is rocked to effect emergency application of the brakes, the power is coincidently cut off from the car propelling motor. The usual air compressor 90 may be employed in connection with the reservoirs 78.

We will now describe a structure for indicating the number of passengers occupying the car at any given time and operating to indicate "Car full" when a predetermined number of passengers have boarded or are occupying the car. In this connection it is to be remembered that an apparatus for accomplishing the desired result must be differential in its operation as between boarding and alighting passengers, and must be controlled from both ends of the car since passengers board and alight from both ends of the car. In carrying out our invention in this feature thereof the turnstiles located at the ends of the car are utilized to control the indicator device referred to. This control is effected by employing the turnstiles to control the circuits of magnets which form part of the indicator mechanism, as will be more fully described.

Figure 14:
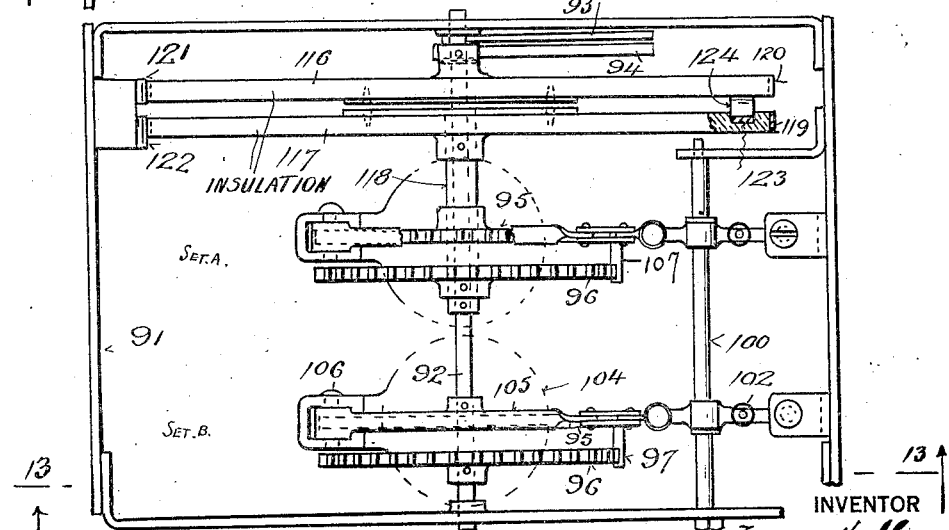
Fig. 14 is a view in vertical section on the line 14, 14, Fig. 13, showing a structure for effecting the automatic indication of the total number of passengers carried at any given time on a car.

Referring to Figs. 13, 14 and 15, in which the indicator structure is shown, the indicator mechanism is mounted within a casing 91, which is designed to be mounted at any desired point within the car in convenient position to be inspected or observed whenever desired. Mounted within casing 91 is a shaft 92 upon which is mounted one member of an indicating dial, as, for example, an index hand or pointer 93, which, in the illustrative arrangement shown, cooperates with a relatively stationary graduated member 94, the relative positions of said members 93, 94, serving to indicate the number of passengers occupying the car at any given instant of time. Mounted on shaft 92 are two sets of ratchet wheels or disks with associated operating pawls and ratchets and actuating magnets. The sets of ratchet mechanism referred to cooperate, respectively, with the turnstile structures at opposite ends of the car.

Each set of ratchet mechanism includes two ratchet disks 95, 96, having their ratchet teeth presented in respectively opposite directions. It is believed that a description of the structure arrangement and operation of one set will be sufficient, as the two sets operate alike. Cooperating with the teeth of ratchet disk 96 is a pawl 97, which is connected, as at 98, to one end of a rock lever 99, carried by a stud 100, the other arm of said rock lever operating between adjustable screw abutments 101. The rock lever is restrained to an initial position to hold the pawl 97 out of engagement with its associated disk 96, by means of a spring 102. The pawl, if desired, is yieldingly pressed towards working position by means of a spring 103. Mounted in the casing is a magnet 104, the armature 105, of which is pivotally mounted at one end, as at 106. The free end of the armature is pivotally connected to the rock lever 99. Likewise the pawl 107 which cooperates with disk 95, is yieldingly pressed to its work by spring 108, and is connected to one arm of a rock lever 109, carried by the stud 115, the other arm of which works between adjustable limit screws 110, a spring 111, serving to retain the rock lever and its associated pawl in an initial retracted position. The armature 112 of magnet 113, pivoted as at 114, is connected to rock lever 109 to actuate the pawl 107. The disks 95, 96, of one set, with their respectively associated pawls and actuating magnets, are designed to cooperate respectively with the entrance and exit operations of the turnstile at one end of the car, while the members of the other set of disks and their associated pawls and magnets are designed to cooperate with the entrance and exit operations, respectively, of the turnstile at the other end of the car. For instance, the circuit of magnet 113 is controlled by the entrance operation of one turnstile, and that of magnet 104 is controlled by the exit operation of the same turnstile. Thus every time the turnstile is actuated in entrance direction, the magnet 113 is energized, thereby actuating the pawl 107, and rotatively displacing the disk 95, and with it shaft 92, and index member 93, in one direction and through one step of movement. Likewise at each actuation of the same turnstile in exit operation the magnet 104 is energized, thereby actuating the pawl 97 and disk 96, shaft 92, and index member 93, through one step of movement, but in the opposite direction. Exactly the same operations are accomplished by the entrance and exit actuation of the turnstile at the other end of the car through the other set of disks, pawls and magnets. Thus the shaft 92 is subjected to successive steps of rotative actuations in one direction, and the other according as passengers enter or leave the car, thereby differentially actuating the indicating member 93, and the position of said member at any given instant of time with reference to its cooperating member 94 will reveal the number of passengers on the car. If passengers board the car in greater number than those who alight, the shaft 92 will be rotatively displaced step by step to a greater and greater extent. This is taken advantage of in carrying out our invention by utilizing the rotative movement of said shaft if continued to a predetermined extent, that is, when a predetermined desired maximum number of passengers occupy the car, to cause a "Car full" sign or indicator to be put into action. Various arrangements may be employed to accomplish the desired result. In the particular illustrative arrangement shown, a sign indicating that the car is full, that is, is carrying the desired maximum number of passengers, is mounted in convenient display position, say in the end walls of the car, with which signs illuminating lamps are employed. The circuits of these lamps are controlled by the indicator mechanism above described in such manner that the lamps become illuminated when the predetermined maximum number of passengers occupy the car. This may be accomplished in various ways. A simple illustrative arrangement is shown wherein insulating disks 116 and 117 are mounted, the one on shaft 92, to rotate therewith, and the other on a sleeve 118, carried by the shaft, whereby the two insulating disks partake relatively to each other, of the differential movements of shaft 92, imparted, as above described, through the sets of ratchet disks and pawls. The disks 116, 117, carry conducting rings 119, 120, around their respective peripheries, with which respectively contact the spring contact fingers 121, 122, arranged in the circuit of the "Car full" illuminating lamps. Carried by one of the disks 116, 117, is a short conducting segment 123, and by the other a cooperating contact wiper spring 124. The conducting segment 123, and contact spring 124 are respectively in electrical connection with the conductor rings 119, 118, of the disks 117, 116. With this commutating switch arrangement it will be seen that the circuit of the sign illuminating lamp is broken until in the operation of the turnstiles the differential movement imparted to shaft 92 is of sufficient extent to cause the contact wiper spring 124 to be brought into contact with the conductor segment 123. This does not occur until the predetermined maximum number of passengers occupy the car. When such contact is made, however, the sign illuminating lamp circuit is closed and the sign is illuminated. By making the conductor segment 123 of greater or less length, a desirable latitude is permitted in the duration of the time the sign lamps remain lighted, that is, a limited excess of the predetermined maximum number of passengers to be carried is permitted. Of course, it is to be understood that the relative initial positions of the conductor segment 123 and wiper contact 124 is determined by the prescribed predetermined maximum number of passengers to be carried, that is, by the predetermined maximum degree of differential rotary movement imparted to the shaft 92. It is also to be understood that a "Car full" sign, of the nature above described, may be located at each end of the car.

In Fig. 16, we have shown a circuit diagram of the electrical connections concerned in the operation of a car equipment embodying the principles of our invention.

We will first describe the circuit connections effected by the deposit of a coin in a fare box. It will be sufficient to describe the circuit arrangement and operation of a turnstile at only one end of the car, as the same arrangement is employed for the turnstile operation at the other end of the car. It will be assumed that the parts are in their normal positions with the car doors opened and the car at a stop ready for a passenger to board the car, where the turnstile is coin-controlled for entering passengers, or ready for a passenger to alight in the same case where the turnstile is coin controlled for alighting passengers. Under these conditions the main switch 130 is closed, thereby closing a circuit from the trolley or other source through conductor 131 to conductor 132. Thence the circuit of the turnstile lock and fare box relay device is completed through conductor $b$, to one of the coin controlled contacts 133, this circuit being completed between said contacts when the coin is deposited, thereby continuing the circuit $b$, through the normally closed contact device 134, and on through the farebox relay magnet 135 and thence to the point 136 where it joins the transfer switch circuit presently to be described and thence through the conductor $a$, to an ordinary four pole double throw switch structure diagrammatically indicated at 137 which for the purposes of this description is considered to now be closed in its downward position, and thence through conductor $a$, through the contact spools on the turnstile shaft indicated generally at 138, and thence to return conductor 139, door switch 140, to main switch 130, and return wire 141. The resulting energization of the fare box relay 135 causes the switch device indicated generally at 142 to be operated thereby closing the circuit through 143 of said switch device, and thereby establishing a holding circuit for relay magnet 135 from conductor $b$, through conductor 144, switch device 143, and thence through relay magnet coil 135, and on as before. With the parts in normal position thereof as assumed without a deposited coin between contacts 133, the turnstile lock magnet 62 is energized to lock the turnstile against non-fare control operation.

The energizing circuit through lock magnet 61 under these conditions is defined as follows: When the fare is deposited, resulting in closing the circuit of fare box relay magnet 135, the switch device indicated at 160 is closed. This closes the circuit of turnstile lock magnet 61 as follows: from the positive supply conductor 132, through conductor $d$, magnet 61, conductor $d$, to the double throw switch device 137 thence on through conductor $d$, switch device 160, conductor $d$, to return conductor 139. The completion of this circuit energizes magnet 61, which through the devices, above described, (see Figs. 8 and 9) releases the turnstile for coin controlled operation, and locks it against the reverse non-coin controlled operation. As above indicated, the turnstile magnet 62 is normally energized. This is accomplished as follows: from the main supply conductor 132, through conductor $d$, magnet 62, conductor $c$, to the double throw switch device 137, thence on through conductor $c$, switch device 161, conductor $c$, switch device 162, conductor $c$, to return conductor 150. This circuit, it will be observed, is normally closed when the fare box relay magnet 135 is deenergized, that is, when the switch device 161 is closed. When said relay magnet is energized, however, by the deposit of a coin, this switch device 161 is open.

Thus it will be seen that the circuit of turnstile magnet 62 is normally closed while that of the turnstile lock magnet 61 is controlled by the deposit of the coin. It may be well to point out here that the above description relates to the circuits when the turnstile is at one of its extreme positions of the movement on the tracks 48. For purposes of description let it be assumed that the turnstile is in the position shown in Figure 6 and that switch 137 is closed downwardly. When the turnstile is moved to its other extreme position on tracks 48, the turnstile switch 137 will be closed upwardly, then the operations which occurred when the turnstile was in its first position are reversed which reversal of the operations is secured by reason of the fact that turnstile magnet 61 now becomes normally energized while turnstile magnet 62 is only energized upon the deposit of a coin or the operation of the transfer relay magnet. This is necessary since in order to effect the same type of operations with the turnstile at the opposite side of the car for the same movement of passengers, the turnstile will operate in the reverse direction.

As soon as the turnstile is rotated through substantially a quarter turn, the upper segment of the drum switch 138 moves out of engagement with the conductor $a$, thereby deenergizing release relay 135, which returns to its initial position to deenergize the pawl controlling or turnstile magnet 61 and energize the magnet 62. In the case where the turnstile is swung from the position assumed for purposes of this description as being that in Fig. 6 to the other side of the car the deenergization of release relay 135 opens the energizing circuit of magnet 62 and closes the energizing circuit of magnet 61 which it will be remembered is now normally energized with the turnstile in this new position. Likewise, if the turnstile is moved a quarter of a turn in the reverse direction, the release magnet 135 is automatically deenergized by the breaking of its circuit at the drum switch 138.

We will now describe the circuit arrangement concerned in the operation of the "Car full" signs. These "Car full" signs at the respective ends of the car are indicated at 145, 146. The circuit of said devices receives current from trolley through conductor 132, switch device 147, conductor $g$, sign device 145, conductor $g$, commutating "Car full" switch device indicated generally at 148, conductor $g$, through sign device 146, conductor $g$, switch device 149, conductor $g$, conductor 150, and return conductor 159, switch 130 and positive conductor 141.

We will now describe the circuit connections concerned in the operation of the motors employed for opening or closing the doors. In the arrangement shown, one magnet coil 151 is employed to control the opening movements of the door motor, and one 152 for controlling the closing movements of the door motor. The circuits of these magnets are controlled by push-button switch devices 153, 154, located in convenient position to be operated by the motorman and indicated at 35 in Figs. 2 and 6. It is to be understood that the car side door located at the same end of the car with the motorman is to be manually controlled through the manually door control connections indicated at 34 and 45, Fig. 6 and therefore, pushbuttons, 153, 154 are employed at the station of the motorman for controlling the motor operated door at the far end of the car. When push-button 153, for example, is operated by the motorman, a circuit is completed from a convenient current source through positive conductor terminal 157 through conductor $h$, door engine control magnet 151, conductor $h$, through push-button switch 153, through the conductor segment 155, on the car controlling motor controller shaft, thence through conductor $h$, to the negative terminal 156. If the button 154 is closed, then the circuit is completed from terminal 157 through conductor $h$, door engine control magnet 152, circuit conductor $j$, button switch 154, to conductor $h$, controller segment 155, and thence to negative terminal 156. Thus it will be seen that the car motor controller must be in a position for segment 155 to close the gap in conductor $h$. This occurs only when the controller is in "off" position. In other words, the controller must be in "off" position before the door can be opened or closed.

In case a passenger presents a transfer instead of a fare, the desired control of the turnstile lock device is effected by the motorman through the operation of the switch device or transfer button 36. By operating this switch a circuit is completed from main supply conductor 132 through conductor $a$, switch device 164, conductor *a*, switch device 36, conductor *a*, controlling segment 165, conductor *a*, to point 167, where the current divides one part continuing through conductor *a*, transfer bell magnets 166, conductor *a*, to controller segment 168. The other part proceeds from point 167 through conductor *a*, the transfer relay magnet 167′, conductor *a*, to controller segment 168, thence the two circuits combine again when the controller segment closes the gap and continues through conductor *a*, to point 136 and thence on through conductor *a*, the double throw switch 137, conductor *a*, turnstile switch 138, conductor *a*, to return conductor 139 and finally to conductor 159, switch 130 and positive conductor 141. The closing of this circuit energized the transfer relay magnet 167′. The energizing of the bell coil 166 closes an interlocking or retaining circuit not only for the magnets 166, but also for the transfer relay magnet 167′ at the point marked "A." The holding circuits for magnets 166 is as follows: from supply conductor 132, through *a*, 164, *a*, A, 167, *a*, magnets 166, *a*, 168, *a*, to 136 and on to return as before. The holding circuit for the relay magnet 167′ likewise is as follows: from 132, through *a*, 164, *a*, A, 167′, *a*, 168, *a*, to 136 and on as before explained, thus the switch A, controls both these retaining circuits. The circuit connections of the relay magnet 167′ at the right hand side of the circuit diagram Fig. 16, are not shown completed in the diagram but such connections will be the same as those above described with reference to the relay magnet 167′ at the left hand side of said circuit diagram. Of course, it is to be understood that the circuit diagram of Fig. 16 is intended to show complete the circuits concerned in the operations which are controlled from one end of the car when the motorman is located at that end and only a portion of the circuits are shown for the control or motorman's station when located at the other end of the car. It is for this reason that the circuit connections of relay magnet 167′ and its associated parts at the right hand side of the diagram are not shown. The energization of transfer relay magnet 167′ opens the switch device 162, which, as above described, is normally closed to maintain turnstile magnet 62 normally energized, thereby deenergizing said magnet. The closing of switch device 170 by the energization of transfer relay magnet 167′ closes the circuit of turnstile lock magnet 61, in the following manner: As stated, when transfer relay magnet 167′ is energized, switch device 170 is closed by the flow of current from the positive leg 141 of the power source, switch 130, conductor 159, switch 140, conductor *d*, switch 170, thence through the conductor from the upper left hand contact of switch 170 to and through conductor *d*, to and through double throw switch 137, conductor *d*, turnstile magnet 61, conductor *d*, conductor 132, switch 130, and thence to the power source through its negative leg 131. This permits the passenger presenting the transfer to leave or enter the car as the case may be.

Of course it will be understood that the transfer switch device 36 is located at each end of the car with the corresponding transfer relay magnet 167′ and switch device controlled thereby.

These circuits of the magnet which control the operation of the pawls which actuate the differential indicator devices may be controlled in any convenient manner. Of course it is to be understood that the circuits of the members of one pair of said magnets, as magnets 104 and 113, are to be controlled by the turnstile at one end of the car and of the members of the other pair by the turnstile at the other end of the car. In the circuit diagram of Fig. 16, we have shown the circuit arrangement for only one pair of said magnets, namely, the magnets 104, 113.

Current is supplied to magnet 104 from the current source through conductor 132, conductor *m*, magnet 104, conductor *n*, to conductor *d*, which conductor is in circuit with switch 160, wire *d*, and conductor 139. In other words magnet 104 is in parallel with the circuit of magnet 61 so that when it is energized by the closing of switch 160, at contact 133, the magnet 104 is likewise energized. The same energization of magnet 61 by the closing of transfer relay switch 170 also effects energization of magnet 104. Thus every time the turnstile is freed for operation either by a coin or by the transfer switch 36, magnet 104 becomes energized.

For magnet 113 a circuit is completed from conductor 132, through conductor *m*, magnet 113, conductor *p*, switch 137 which is down as before, conductor *c* to turnstile switch 138, wire *a* and conductor 139, 159, switch 130 and wire 141. Thus every time the turnstile is rotated so as to admit a passenger, magnet 113 is momentarily energized by the drum switch 138 to operate the indicating device. Thus, each time the turnstile turns in exit operation, the circuit of magnet 104 is completed thereby actuating the indicator shaft 92 in one direction through one step of rotary movement and each time the turnstile turns in entrance operation, the circuit of magnet 104 is completed thereby actuating the indicator shaft through one step of rotary movement in the other direction.

If desired, a switch device 140, may be so arranged as to be controlled by the opening or closing movements of the doors of the car, said switch devices being arranged to control the return connections of circuits *a*, and *d*, above described. These door switches are normally in position to close these return connections when the doors are open. When the doors are closed, these return circuits are opened.

In order to provide against derangement of and possible injury to the mechanism through short circuits, we propose to provide safety ground connections, such as indicated at 195, for the fare box, and at 196 for the turnstile structure.

It may sometimes happen that through accident or other cause, power current may be cut off from the car, in which case there would be no available current on the car to effect a release of the turnstiles for exit operation to permit passengers to alight from the car during the time the power current is cut off therefrom. To avoid this, we propose to provide auxiliary means under the control of the motorman for the emergency release of the turnstiles for free exit operation, or for free operation in both directions. This result can be accomplished in various ways, and either electrically or mechanically. We have shown in Figs. 17 and 18 one illustrative arrangement of mechanical means for accomplishing the desired results, wherein we provide the tail end portions 64, 65, of the pawls 56, 55, with laterally extending portions 200, 201, with which cooperate the ends of arms or cam members 202, 203, carried by short shafts 204, 205, mounted to extend through the top plate or cover 206 of the turnstile base 46. Each shaft 205, 206 is provided with a convenient handle 207, whereby it may be rotated to cause the members 202, 203, to engage the pawl extension 200, 201, and hold the pawls out of engagement with their ratchets, and hence leaving the turnstile free for exit operation, or, as desired, free for operation in either direction.

We have explained that the motorman at the front end of the car has available a hand lever device 34, through which, and intermediate connections 45, a car door at the front end of the car is manually controlled. Experience has shown that it is desirable simultaneously to control the corresponding door at the other end of the car. Various means, electrical or mechanical, may satisfactorily serve this purpose. In Figs. 19 and 20, we have indicated devices to electrically accomplish the result, wherein the shaft 208 of the hand lever device 34 has mounted thereon an insulating block 209, carrying contact segments 210, 211, with which cooperate pairs of contact fingers 212, 213, for controlling the circuits of the magnets which control the operations of the motor for operating a door at the other end of the car.

It is obvious that a car equipment of the nature above set forth may be employed in connection with any type of car, that is, whether of the single end, double end, center opening or other type, and is equally well adapted for use in cars whether operated from an overhead, an underground or other trolley or current supply system.

Having now set forth the objects and nature of our invention and a structure embodying the principles thereof, what we claim as new and useful and of our own invention, and desire to secure by Letters Patent, is,—

1. The combination with a car having a doorway at each end, of a turnstile for each doorway, each turnstile being free for operation in one direction and coin-controlled for operation in the other direction, and means located at each end of the car to release the turnstile at the same end of the car for operation in coin-controlled direction without requiring the deposit of a coin.

2. The combination with a car having a doorway at opposite sides thereof, of a turnstile free for operation in one direction and normally locked against operation in the other direction, said turnstile being shiftable into cooperation with either of said doors and coin controlled electrical devices for releasing the turnstile when in either position for operation in said other direction.

3. The combination with a car having a doorway at opposite sides thereof, of a turnstile free for operation in one direction and normally locked against operation in the other direction, said turnstile being shiftable into cooperation with either of said doors, coin controlled electrical devices for releasing the turnstile when in either position for operation in said other direction and a shiftable gate to cooperate with the turnstile when in either of its positions to form a restricted passageway through the turnstile.

4. The combination with a car having a doorway at opposite sides of the end thereof, of a turnstile shiftable into cooperative relation with respect to either of said doorways, electrical devices to control said turnstile for operation in one direction and coin controlled circuit connections for said devices common to either position of the turnstile.

5. The combination with a car having a doorway at opposite sides thereof, of a turnstile shiftable into cooperative relation with respect to either of said doorways, electrical devices to control said turnstile for operation in one direction and coin controlled circuit connections for said devices common to either position of the turnstile.

6. The combination with a car having a doorway at opposite sides of the end thereof, of a turnstile shiftable into cooperative relation with respect to either of said doorways, said turnstile being free for operation in one direction, and normally locked against operation in the other direction and coin-controlled electrical devices for releasing the turnstile when in either position for operation in said other direction.

7. The combination with a car having a doorway at opposite sides of the end thereof, of a turnstile shiftable into cooperative relation with respect to either of said doorways, said turnstile being free for operation in one direction, and coin-controlled for operation in the other direction, and means to release the turnstile for operation in coin-controlled direction without requiring the deposit of a coin.

8. The combination with a car having a doorway at opposite sides of the end thereof, of a turnstile shiftable into cooperative relation with respect to either of said doorways, and a shiftable gate cooperating with the turnstile when in either of its shifted positions to form a restricted passageway therefor, electrical devices to control each turnstile for operation in one direction and coin-controlled circuit connections for said devices for each turnstile, said connections being common to either position of each turnstile.

9. The combination with a car having a doorway at opposite sides of each end thereof, of a turnstile at each end of the car, each turnstile being shiftable into cooperative relation with either doorway at the same end of the car therewith, electrical devices to control each turnstile for operation in one direction and coin controlled circuit connections for said devices for each turnstile, said circuit connections being common to either position of each turnstile.

10. The combination with a car having a doorway at opposite sides of each end thereof, of a turnstile at each end of the car, each turnstile being shiftable into cooperative relation with either doorway at the same end of the car therewith, and coin controlled means located at each end of the car to control the operation of the turnstile at the same end of the car in either of its shifted positions.

11. The combination with a car having a doorway at opposite sides of each end thereof, of a turnstile at each end of the car, and a gate located at each end of the car and shiftable to position to form, with the turnstile, a restricted passageway through the turnstile to and from either doorway, electrical devices to control said turnstile for operation in one direction and coin controlled circuit connections for said devices common to either position of the turnstile.

12. The combination with a car having a doorway at opposite sides of each end thereof, of a turnstile at each end of the car, each turnstile being shiftable into cooperative relation with either doorway at the same end of the car therewith, each turnstile being normally free for operation in one direction, and normally locked against operation in the other direction and coin controlled electrical devices for releasing the turnstile when in either position for operation in said other direction.

13. The combination with a car having a doorway at opposite sides of each end thereof, of a turnstile at each end of the car, each turnstile being shiftable into cooperative relation with either doorway at the same end of the car therewith, each turnstile being normally free for operation in one direction, and coin-controlled for operation in the other direction, and means located at each end of the car to release the turnstile at the same end of the car for operation in coin-controlled direction without requiring the deposit of a coin.

14. The combination with a car having a doorway at opposite sides of each end thereof, of a turnstile at each end of the car, arranged to cooperate with either doorway at the same end therewith, coin controlled devices to control the operation of each turnstile, and means at each end of the car to control the turnstile at the same end of the car and in either of its shifted positions independently of the coin controlled means.

15. The combination with a car having a doorway at opposite sides of each end thereof, of a turnstile at each end of the car, each turnstile being normally free for operation in one direction, and coin-controlled for operation in the other direction and means at each end of the car to release the turnstile at that end of the car for operation independently of the coin control thereof.

16. The combination with a car having a doorway at opposite sides of each end thereof, of a turnstile at each end of the car, each turnstile being normally free for operation in one direction, and coin-controlled for operation in the other direction, and means located at each end of the car to release the turnstile at the same end of the car for operation in coin-controlled direction without requiring the deposit of a coin.

17. The combination with a car having an end platform, and doorways at the opposite sides of said platform, of a railing extending transversely across the platform, and a turnstile mounted on the platform and cooperating with said railing to form a restricted passageway controlled by the turnstile to and from either of said doorways, said turnstile being coin controlled for operation in one direction and free for operation in the other direction.

18. The combination with a car having an end platform, and doorways at the opposite sides of said platform, of a railing extending transversely across the platform, a turnstile mounted on the platform and shiftable to one side or the other thereof and when in either shifted position cooperating with said railing to form a turnstile controlled restricted passageway, said turnstile being free for operation in one direction and coin controlled electrical devices to release the same for operation in the other direction, and a flexible conductor connection for said electrical devices.

19. The combination with a car having an end platform, and doorways at the opposite sides of said platform, of a railing extending transversely across the platform, a turnstile, and a shiftable gate, said railing, turnstile and shiftable gate cooperating to form a restricted passageway controlled by the turnstile to and from either of said doorways, said turnstile being free for operation in one direction and coin controlled electrical devices to release the same for operation in the other direction, and a flexible conductor connection for said electrical devices.

20. The combination with a car having an end platform at each end thereof, and a doorway at each side of each platform, of a railing extending transversely across each platform, and a turnstile mounted on each platform and cooperating with the adjacent railing to form a restricted passageway controlled by the turnstile to and from either of said doorways, each of said turnstiles being free for operation in one direction and normally locked against operation in the other direction, and coin controlled devices to release each turnstile for operation in said other direction.

21. The combination with a car having an end platform at each end thereof, and a doorway at each side of each platform, of a railing extending transversely across each platform, and a turnstile mounted on each platform, and shiftable into position with respect to each doorway to form with said railing a turnstile controlled restricted passageway to and from either of said doorways, each of said turnstiles being free for operation in one direction and normally locked against operation in the other direction and coin controlled devices to release each turnstile for operation in said other direction.

22. The combination with a car having an end platform at each end thereof, and a doorway at each side of each platform, of a railing extending transversely across each platform, and a turnstile mounted on each platform, and cooperating with the adjacent railing to form a restricted passageway controlled by the turnstile to and from either of said doorways, each turnstile being free for operation in one direction and normally locked against operation in the other direction and coin controlled electrical devices for releasing the turnstile when in either position for operation in said other direction.

23. The combination with a car having an end platform at each end thereof, and a doorway at each side of each platform, of a railing extending transversely across each platform, and a turnstile mounted on each platform, and cooperating with the adjacent railing to form a restricted passageway controlled by the turnstile to and from either of said doorways, each turnstile being free for operation in one direction and coin-controlled for operation in the other direction, and means located at each end of the car to control the operation of the turnstile at the same end of the car in coin-controlled direction independently of the coin control release.

24. The combination with a car having an end platform at each end thereof, and a doorway at each side of each platform, of a railing extending transversely across each platform, and a turnstile mounted on each platform, and a correspondingly shiftable gate, said turnstile, gate and railing cooperating to form a restricted passageway controlled by the turnstile to and from either of said doorways, each of said turnstiles being free for operation in one direction and normally locked against operation in the other direction, and coin controlled devices to release each turnstile for operation in said other direction.

25. The combination with a car having a doorway and a turnstile cooperating therewith, said turnstile being free for operation in one direction and coin-controlled for operation in the other direction, of indicating devices and means controlled respectively by the operations in opposite directions of the turnstile to differentially operate said indicating devices whereby the number of passengers occupying the car at any given instant is indicated.

26. The combination with a turnstile free for operation in one direction and controlled for operation in the other direction, of differentially operated indicator devices controlled by the turnstile operations to indicate the number of passengers occupying the car at any given instant.

27. The combination with a turnstile free for operation in one direction and controlled for operation in the other direction, of indicating devices, and mechanisms for operating the same in opposite directions, said mechanism being controlled by the operations in opposite directions of the turnstile to indicate the number of passengers occupying the car at any given instant.

28. The combination with a turnstile free for operation in one direction and controlled for operation in the other direction, of indicating devices, and ratchet actuated mechanisms for operating the same in respectively opposite directions, said ratchet mechanisms being respectively controlled by the operations of the turnstile in opposite directions to indicate the number of passengers occupying the car at any given instant.

29. The combination with a turnstile free for operation in one direction and controlled for operation in the other direction, a shaft, indicator devices carried thereby, and means controlled by the operations of the turnstile in opposite directions to rotatively move said shaft in correspondingly opposite directions to differentially indicate the number of passengers occupying the car at any given instant.

30. The combination with a turnstile free for operation in one direction and controlled for operation in the other direction, of indicator devices, and electrically operated devices respectively operating to actuate said indicator devices differentially, said electrically operated devices being respectively controlled by the operations of the turnstile in opposite directions to indicate the number of passengers occupying the car at any given instant.

31. The combination with a turnstile free for operation in one direction and controlled for operation in the other direction, of indicator devices, ratchet mechanisms respectively operating the same in opposite directions, a magnet for actuating each ratchet mechanism, the circuits of said magnets being respectively controlled by the operations of the turnstile in opposite directions to indicate the number of passengers occupying the car at any given instant.

32. The combination with a turnstile free for operation in one direction and controlled for operation in the other direction, of differentially operated indicator devices controlled by the turnstile operations, and a signal device controlled by said differential indicator devices.

33. The combination with a car having a doorway, and a turnstile to control the passage to and from said doorway, said turnstile being free for operation in one direction, and controlled for operation in the other direction, of an indicator device, and means controlled by the operations of the turnstile in opposite directions to actuate said indicator device differentially to indicate the number of passengers occupying the car at any given instant.

34. The combination with a car having a doorway, and a turnstile to control the passage to and from said doorway, said turnstile being free for operation in one direction, and controlled for operation in the other direction, of an indicator device, and means controlled by the operations of the turnstile in opposite directions to actuate said indicator device differentially, and a signal device controlled by said indicator device.

35. The combination with a car having a doorway, and a turnstile to control the passage to and from said doorway, said turnstile being free for operation in one direction, and controlled for operation in the other direction, of an indicator device, and means controlled by the operations of the turnstile in opposite directions to actuate said indicator device differentially, and a car-full sign controlled by the differential operation of said indicator device.

36. The combination with a car having a doorway, and a turnstile to control the passage to and from said doorway, said turnstile being free for operation in one direction, and controlled for operation in the other direction, of an indicator device, and means controlled by the operations of the turnstile in opposite directions to actuate said indicator device differentially, and a signal device controlled by the differential operation of said indicator device when its differential operation attains a predetermined extent.

37. The combination with a car having a doorway at opposite ends thereof, and a turnstile cooperating with each door, each turnstile being free for operation in one direction, and controlled for operation in the other direction, of an indicator device, and means controlled by both turnstiles for actuating said indicator device differentially.

38. The combination with a car having a doorway at opposite ends thereof, and a turnstile cooperating with each door, each turnstile being free for operation in one direction, and controlled for operation in the other direction, of an indicator device, and means controlled by both turnstiles for actuating said indicator device differentially, and a signal device controlled by said differential indicator device.

39. The combination with a car having a doorway at opposite ends thereof, and a turnstile cooperating with each door, each turnstile being free for operation in one direction, and controlled for operation in the other direction, of an indicator device, and means controlled by both turnstiles for actuating said indicator device differentially, and a signal device controlled by the differential operation of said indicator device when its differential operation attains a predetermined extent.

40. The combination with a turnstile free for operation in one direction and controlled for operation in the other direction, of differentially operated indicator devices controlled by the turnstile operations, a signal device, and a circuit therefor, said signal device circuit being controlled by the differential movement of said indicator device.

41. The combination with a car having a doorway, and a turnstile to control the passage to and from said doorway, said turnstile being free for operation in one direction, and controlled for operation in the other direction, of an indicator device, and means controlled by the operations of the turnstile in opposite directions to actuate said indicator device differentially, a signal device, and a circuit therefor, said signal device circuit being controlled by the differential movement of said indicator device.

42. The combination with a car having a doorway at opposite ends thereof, and a turnstile cooperating with each door, each turnstile being free for operation in one direction, and controlled for operation in the other direction, of an indicator device, and means controlled by both turnstiles for actuating said indicator device differentially, a signal device, and a circuit therefor, said circuit being controlled by said indicator device.

43. The combination with a car having a doorway, and a turnstile to control the passage to and from said doorway, said turnstile being free for operation in one direction and controlled for operation in the other direction, of means controlled by the conjoint operations of the turnstile in opposite directions to indicate when a predetermined number of passengers occupy the car.

44. The combination with a car having a doorway at opposite ends thereof, and a turnstile cooperating with each door, each turnstile being free for operation in one direction and controlled for operation in the other direction, of means controlled by the combined action of the turnstiles to indicate when a predetermined number of passengers occupy the car.

45. The combination with a car having a doorway, and a turnstile to control the passage to and from said doorway, said turnstile being free for operation in one direction, and controlled for operation in the other direction, of means controlled by the conjoint operations of the turnstile in respectively opposite directions to indicate the number of passengers occupying the car at any given time.

46. The combination with a car having a doorway at opposite ends thereof, and a turnstile cooperating with each door, each turnstile being free for operation in one direction, and controlled for operation in the other direction, of means controlled by the conjoint operations of the turnstile in respectively opposite directions to indicate the number of passengers occupying the car at any given time.

47. The combination with a car having a doorway, and a turnstile to control the passage to and from said doorway, said turnstile being free for operation in one direction and controlled for operation in the other direction, of means controlled by the operations of the turnstile to indicate when a predetermined number of passengers occupy the car, and a signal device, said indicating means also operating to control said signal device.

48. The combination with a car having a doorway at opposite ends thereof, and a turnstile cooperating with each door, each turnstile being free for operation in one direction and controlled for operation in the other direction, of means controlled by the combined action of the turnstiles to indicate when a predetermined number of passengers occupy the car, and a signal device, said indicating means also operating to control said signal device.

49. The combination with a car having a doorway, and a turnstile to control the passage to and from said doorway, said turnstile being free for operation in one direction, and controlled for operation in the other direction, of means controlled by the operations of the turnstile to indicate the number of passengers occupying the car at any given time, and a signal device, said indicating means also operating to control said signal device.

50. The combination with a car having a doorway at opposite ends thereof, and a turnstile cooperating with each door, each turnstile being free for operation in one direction, and controlled for operation in the other direction, of means controlled by the operations of the turnstile to indicate the number of passengers occupying the car at any given time, and a signal device, said indicating means also operating to control said signal device.

51. The combination with a car having a platform and side doorways and doors at each end thereof, of turnstiles located at each doorway, each turnstile being normally free for operation in one direction, and coin-controlled for operation in the other direction, means located at each end of the car to control the operation of the doors at each end of the car, and means also arranged at each end of the car to release the turnstile at the other end of the car for operation in coin-controlled direction without the deposit of a coin.

52. The combination with a car having a doorway at each end, of a turnstile for each doorway, each turnstile being free for operation in one direction and coin-controlled for operation in the other direction, and means located at each end of the car to release the turnstile at the same end of the car for operation in coin-controlled direction without requiring the deposit of a coin, and means to register the released operations of the turnstile.

53. The combination with a car having a doorway at opposite sides of each end thereof, of a turnstile at each end of the car, each turnstile being normally free for operation in one direction, and coin-controlled for operation in the other direction, and means located at each end of the car to release the turnstile at the same end of the car for operation in coin-controlled direction without requiring the deposit of a coin, and means to register the released operations of the turnstile.

In testimony whereof we have hereunto set our hands on this 23rd day of January, A. D. 1923.

FRANK HEDLEY.
JAMES S. DOYLE.